May 17, 1927.
E. PAUSE
1,629,359
DEVICE FOR EFFECTING A STERILE CLOSURE FOR PRESERVE CONTAINERS
Filed March 30, 1926
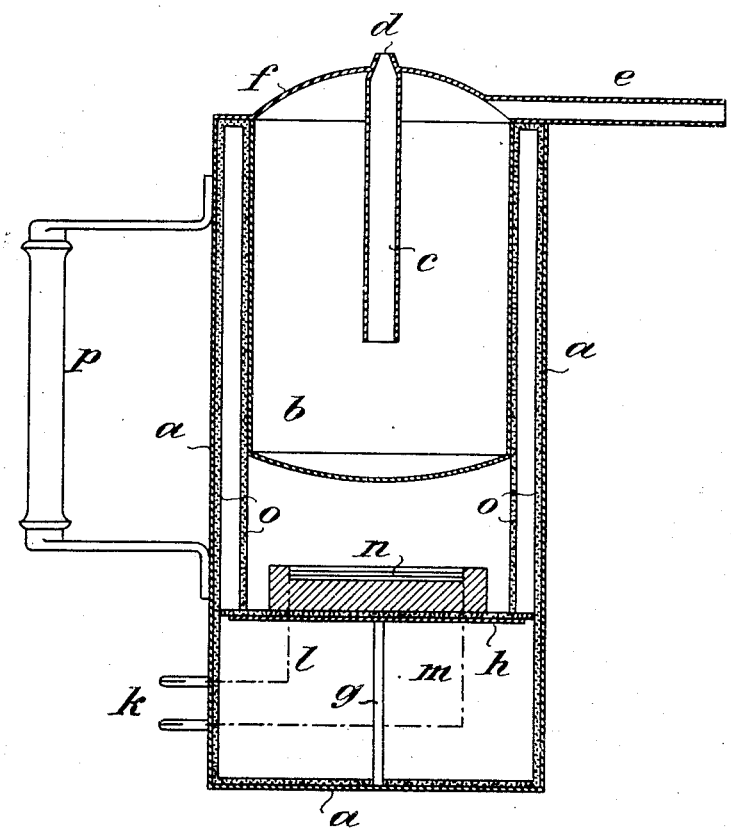
Inventor.
E. Pause
by
Atty Patented May 17, 1927.

1,629,359

UNITED STATES PATENT OFFICE.

ERNST PAUSE, OF COLOGNE-MULHEIM, GERMANY.

DEVICE FOR EFFECTING A STERILE CLOSURE FOR PRESERVE CONTAINERS.

Application filed March 30, 1926, Serial No. 98,630, and in Germany February 14, 1925.

Superheated steam has already been employed for effecting the sterile closure of preserve containers, this being introduced by means of a small pipe provided with an insulated handle, which is pressed between the cover and the glass container which is filled with the preserve. To do this the steam must be brought from the necessary steam apparatus through an insulated pipe to the filling mechanism, which is very inconvenient and disadvantageous for the object in view. On the one hand the free manual operation of the device is interfered with and necessarily confined to the neighbourhood of the steam apparatus, or on the other hand the steam undergoes a considerable cooling due to the long distance it must be conducted and also particles of foreign bodies from the pipe may be introduced into the preserve container, which renders the sterilization of the preserve doubtful.

The object of the invention is a device for effecting a sterile closure for preserve containers, in which superheated steam is introduced into the container filled with the preserve through a pipe which is pressed between the cover and the glass body of the container, whereby the disadvantages of the known devices are avoided in that an electric heating device is introduced into a portable and freely movable receptacle, together with a second smaller receptacle for containing water provided with one pipe passing through the cover and reaching low down into the water, and with a second pipe directly communicating with the steam space, the water receptacle being heated from the enclosed electric heating device by means of lead wires and contacts. The superheated steam thus produced on the spot can then be introduced under high pressure and at high velocity through the short pipe into the preserve container by bringing the portable device into proper position, without undergoing any unnecessary cooling. The air in the container is thereby driven out and the empty space in the latter filled with the superheated steam, by which means a thorough sterilization is secured, and simultaneously the container is so highly heated, that the steam will not condense on the container walls, but the empty space of the receptacle remains filled with steam until after removal of the device the cover of the container is applied, when owing to the external cooling condensation of the steam and a high vacuum results, so that an extremely secure closure of the container is effected. Overheating and burning of the device owing to exhaustion of the water supply is prevented by the fact that the water receptacle is provided with a pipe having an aperture, said pipe passing through the cover and reaching low down into the water space. If the water level sinks below the bottom of the pipe, the steam, which normally only passes through the pipe directly communicating with the steam space, also escapes through the second pipe, by which warning is given that the water supply requires renewing. Again, the electrical heating device is mounted in the insulated heating space of the container on a plate covered with asbestos or the like, with a predetermined distance between it and the bottom of the water receptacle, in order to prevent too fierce heating of the latter should the water supply become very low, the transmission of heat being effected only through radiation and the air present in the heating space.

In the drawing a constructional form of the object of the invention is illustrated in cross section.

In a portable and freely movable receptacle $a$ provided with a handle $p$ is fixedly mounted a second receptacle $b$ for containing water, the latter receptacle as well as the receptacle $a$ being closed by means of a cover $f$, and being furnished with a pipe $c$ having an outlet $d$ and passing through the cover low down into the water space, and also with a second pipe $e$ communicating directly with the steam space. An electrical heating device $n$, which can be connected with the terminals of a source of electric power by means of contacts $k$ and lead wires $l$, $m$, is mounted in the heat space of the receptacle $a$, which is insulated with mica and asbestos. The heating device $n$ is supported by a plate $h$ covered with asbestos or the like, and spaced from the bottom of the receptacle $a$ by means of a rod $g$, and is separated a predetermined distance from the bottom of the water receptacle $b$, the latter thus becoming heated for the production of superheated steam. The steam flows normally only through the pipe *e* which is introduced between the cover and the body of the preserve container, so that the superheated steam is passed into the latter immediately, and without undergoing previous cooling, under high pressure and with high velocity, forming a cloud of steam in the empty space of the container which drives out the air contained therein and then permeates the receptacle thoroughly with steam and comes closely into contact with the preserve in it, so that a very efficient sterilization is secured. The walls and cover of the preserve container are also highly heated, so that the steam does not condense thereon, but completely fills the empty space and so remains until after a short time the device is removed, and the cover again firmly applied. In consequence of the external cooling there then follows a condensation of the steam remaining in the container and the production thereby of a high vacuum, which results in a very effective closure. If the water in the receptacle *b* sinks below the bottom end of the pipe *c*, the steam can also escape through the pipe and through the nozzle *d* and thus show that the water supply needs renewing. The pipe *c* can also be used for filling the receptacle with water, but for this purpose a funnel is supplied. The steam escaping from the pipe *c* or the nozzle *d* can be made to give an audible warning.

I claim:

1. A device for effecting a sterile closure for preserve containers, comprising an outer container, an inner water-container spaced from said outer-container, a cover to said inner and outer containers, an electrical heating element supported within said outer container and spaced from said inner water container, means for supplying electric current to said heating element, a tube for delivering steam generated in said inner water container to the point required, and a tube dependent from said cover into the water space of said inner water-container, said tube being adapted normally to be immersed in the contents of said inner water container.

2. A device for effecting a sterile closure for preserve containers, comprising an outer container, a handle attached to said outer container, an inner water container spaced from said outer container, a cover to said inner and outer containers, an electrical heating element supported within said outer container and spaced from said inner water-container, means for supplying electric current to said heating element, a tube for delivering steam generated in said inner water container to the point required, and a tube dependent from said cover into the water space of said inner water-container, said tube being adapted normally to be immersed in the contents of said water container.

3. A device for effecting a sterile closure for preserve containers, comprising an outer container, an inner water container a cover to said inner and outer containers, a supporting plate within said outer container, an insulating lining between said inner and outer containers, said lining extending below said inner water-container to meet said supporting plate and form a heat-space, an electrical heating element located upon said supporting plate and within said heating space and spaced from the bottom of said inner water-container, means for supplying electric current to said heating element, and means for delivering steam generated in said inner water container to the point required.

4. A device for effecting a sterile closure for preserve containers, comprising an outer container, an inner water-container spaced from said outer container, a cover to said inner and outer containers, a supporting plate within said outer container, an insulating lining between said inner and outer containers, said lining extending below said inner water-container to meet said supporting plate and form a heat space, an electrical heating element located upon said supporting plate and within said heating space and spaced from the bottom of said inner water-container, means for supplying electric current to said heating element, means for delivering steam generated in said inner water container to the point required, and a tube dependent from said cover into the water space of said inner water-container.

5. A device for effecting a sterile closure for preserve containers, comprising an outer container, a handle attached to said outer container, an inner water container spaced from said outer container, a cover to said inner and outer containers, a supporting plate within said outer container, an insulating lining between said inner and outer containers, said lining extending below said inner water container to meet said supporting plate and form a heat space, and an electrical element located upon said supporting plate and within said heating space and spaced from the bottom of said inner water-container, means for supplying electric current to said heating element and means for delivering steam generated in said inner water container to the point required.

6. A device for effecting a sterile closure for preserve containers, comprising an outer container, a handle attached to said outer container, an inner water-container spaced from said outer container, a cover to said inner and outer containers, a supporting plate within said outer container, an insulating lining between said inner and outer containers, said lining extending below said inner water-container to meet said supporting plate and form a heat-space, an electrical heating element located upon said supporting plate and within said heating space and spaced from the bottom of said inner water container, means for supplying electric current to said heating element, means for delivering steam generated in said inner water-container to the point required, and a tube dependent from said cover into the water space of said inner water container.

ERNST PAUSE.